P. F. GALLAGHER.
FLEXIBLE STAY BOLT.
APPLICATION FILED JULY 3, 1914.

1,137,600.

Patented Apr. 27, 1915.

Witnesses
C. C. Faunce
L. C. Hines

Inventor
Peter F. Gallagher
By Victor J. Evans
Attorney

UNITED STATES PATENT OFFICE.

PETER F. GALLAGHER, OF BALTIMORE, MARYLAND, ASSIGNOR OF FORTY-NINE ONE-HUNDREDTHS TO PHILIP CONNIFF, OF BALTIMORE, MARYLAND.

FLEXIBLE STAY-BOLT.

1,137,600.  Specification of Letters Patent.  Patented Apr. 27, 1915.

Application filed July 3, 1914.  Serial No. 848,907.

*To all whom it may concern:*

Be it known that I, PETER F. GALLAGHER, a citizen of the United States, residing at Baltimore, in the State of Maryland, have invented new and useful Improvements in Flexible Stay-Bolts, of which the following is a specification.

My invention relates to flexible stay bolts for connecting the outside and fire box sheets of a boiler, the primary object in view being to provide a construction which allows an ample range of flexibility of the bolt, while at the same time strengthening and reinforcing the sheets about the bolt openings and permitting expansion and contraction of the sheets without distorting the bolt connection.

A further object of the invention is to provide integral flanges or seats upon the sheets for the bolt about the bolt openings, said flanges or seats being struck up directly from the sheets, whereby greater strength and durability of the connections and greater flexibility of the bolt are obtained, and liability of leakage or breakage of the parts at the joints avoided or materially diminished.

A further object of the invention is to provide means whereby the end of the bolt connected with the fire box sheet will be better protected from the heat and greater expansion and contraction allowed at the joint to prevent cracking or distortion of the parts.

The invention consists of the features of construction, combination and arrangement of parts herein fully described and claimed, reference being had to the accompanying drawing in which:—

Figure 1:
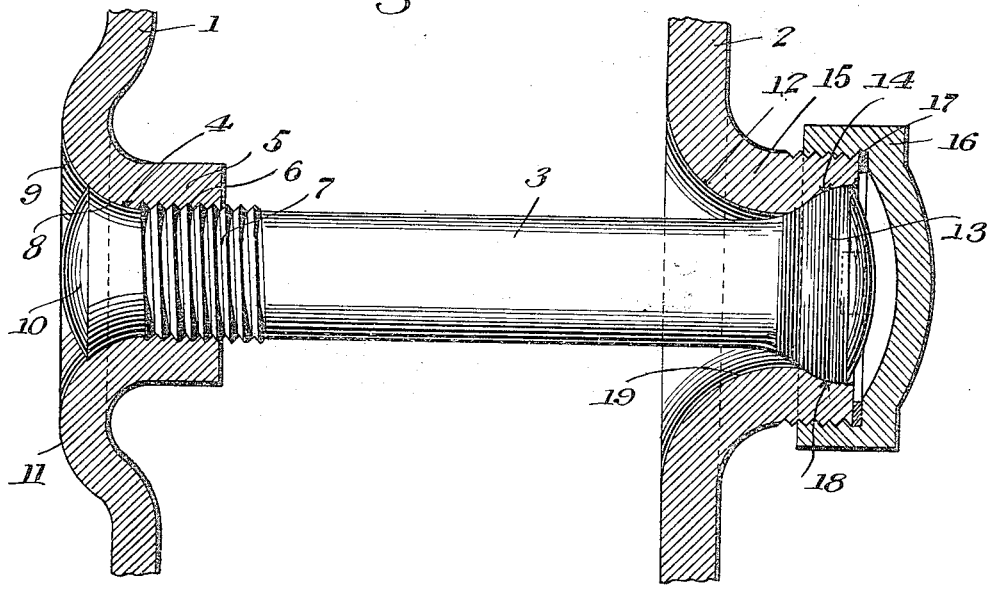
Figure 2:
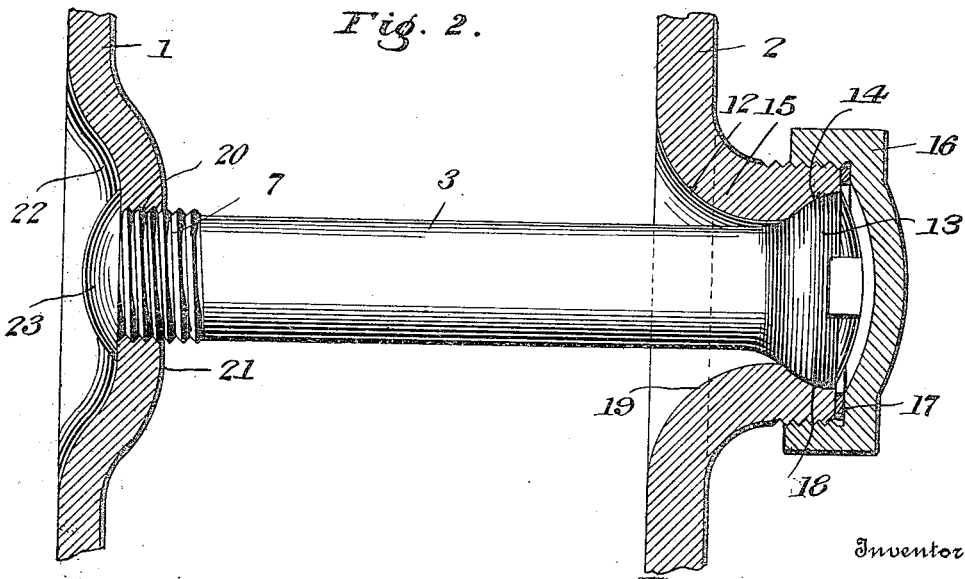

Figure 1 is a sectional view showing the invention. Fig. 2 is a similar view illustrating a modification.

Referring to the drawing, 1 designates the inside or fire box sheet, 2 the outside sheet, and 3 the stay bolt. As shown in Fig. 1, the sheet 1 is formed with a bolt opening 4, and is punched outwardly to provide a tubular seat flange 5 communicating at its inner end with said bolt opening and projecting outwardly beyond the plane of the sheet. The said tubular sheet flange is internally threaded at its outer end, as shown at 6, to receive the threaded end 7 of the bolt, and is internally flared at its inner end, as shown at 8, at its point of juncture with the opening 4, which is flared inwardly on the fire box side, as shown at 9, and on an arc of curvature of a desired radius. The end of the bolt connecting with the sheet 1 is headed or riveted into the opening 4, as shown at 10, the headed or riveted portion thereof being flared to conform to the flare of the opening and surface 9. By this construction it will be observed that the threaded connection is at a point outwardly beyond the plane of the sheet 1 and wholly within the outer portion of the seat flange 5, within the inner portion of which the headed end 10 of the bolt is substantially inclosed, so as to lie within the plane of the portion of the sheet in which the bolt opening is formed. By this construction the end of the bolt is to a certain degree shielded and disposed out of the direct fire line, thus preventing the bolt from becoming heated to a greater degree than the adjacent portion of the sheet and eliminating liability of cracking of the parts at the joint resulting from widely varying degrees of construction and expansion of the bolt and the portion of the sheet with which it is connected. It will also be observed that the seat flange 5 gives an extended support for the threaded end of the bolt and disposes such threaded portion within the water space, at a point where it is protected from undue expansion and contraction, thus obviating or diminishing to a material extent liability of leakage at the joint. It will be evident also, from the foregoing description, that the formation of the tubular seat flange 5 strengthens the sheet 1 at a point where it is usually weakest, and where an insecure threaded connection between the bolt and sheet is ordinarily made entirely within the thickness of the sheet, and that by reason of the fact that the flange gives an extended support for the bolt and is capable of a certain degree of flexion at the point where it merges on curved lines into the sheet body, it is obvious that a coupling connection is provided which allows the bolt to have greater flexibility and also permits of expansion and contraction of the parts to a greater degree, without liability of the bolt working loose, cracking or splitting, or of leakage occurring at the joint. To further strengthen and reinforce the sheet 1 at the point of connection of the bolt therewith, the sheet is also offset to, as shown at 11, produce a circular corrugation about the opening 4 and base of the flange 5, and thus reducing liability of warping of the sheet at or surrounding its point of union with the bolt. The strength and durability of the sheet 1 is accordingly increased to a great extent over structures in which the inner ends of the bolts are simply fitted in threaded openings in the sheet and headed.

The sheet 2 is formed with an opening 12 for the reception of the outer end of the bolt 3, which is provided with a head 13 having a partly spherical convex surface 14. The opening 12 is flared inwardly on a curve of desired radius, as shown at 15, and punched outwardly from the body of the sheet in line with said opening is a tubular seat flange 15, which is externally threaded at its outer end to receive a cap nut 16, between which and the outer end of the flange a metallic washer 17 may be interposed when desired. The outer portion of the bore of the tubular flange is formed with a partly spherical concaved surface 18 to receive and fit the surface 14 of the bolt head, which is pivotally seated therein while the inner portion of the bore of said seat flange is flared, as shown at 19, and merges into the flared surface of the bolt opening. It will be evident that by this construction the headed outer end of the bolt is supported beyond the plane of the sheet 2, and is permitted to have motion in the concavity 14 to compensate for variations in the expansion and contraction of the sheets 1 and 2, the flaring form of the opening adapting the bolt to have a wide degree of compensating adjustments without interference and without strain upon the sheets or joints. The tubular seat flange not only reinforces the bolt opening at the point where the sheet is usually weak, but, by being punched out from and integral with the sheet and connected on a curved line with the sheet at its point of juncture therewith, by reason of a bell mouthed formation 15, is adapted to bend or flex to a certain degree with the bolt, thus obviating liability of fracture of the parts when subjected to unusual or extraordinary strain. This construction also obviates the liability of leakage or cracking of parts at the joint occurring in ordinary structures in which the headed outer end of the bolt is seated in a sleeve externally threaded at its inner end to engage a threaded opening in the sheet. As the seat flange is also an integral part of the sheet, the cap nut 16 may be applied and removed without liability of straining the joint member on the sheet, as often occurs in the use of threaded shelves or bushings.

In the form of my invention disclosed in Fig. 2, the connection between the bolt and outside sheet, is the same as shown in Fig. 1, but the connection between the threaded inner end of the bolt and the sheet 1 is modified for the use of bolts of a certain type. As shown, clearly in Fig. 2, the threaded end 7 of the bolt 3 engages a threaded opening 20 in a dished portion 21 of the sheet 1. This dished portion is preferably of circular form and is punched outwardly, so that said dished portion is offset outwardly beyond the plane of the body of the sheet. By this construction a chamber or recess 22 is formed to receive the headed or riveted inner end 23 of the bolt. This headed or riveted end of the bolt is thus caused to lie outside of the fire line and is thus protective to a great degree from the direct heat of the fire, preventing cracking or distortion of the parts due to intense heat. The dished portion also strengthens the sheet 1 at the point where the opening 20 is formed, making it of maximum strength where it is usually weakest. The head 23 in this construction lies outwardly beyond the plane of the body of the sheet and is thus well offset from the fire line, but the structure shown in Fig. 1, in which the headed end 10 of the bolt also lies within the plane of the portion of the sheet in which the opening 4 is formed, and is thus offset from the fire line, has also been found highly efficient as a means for protecting such end of the bolt from the intense heat of the flames.

It will be seen from the structures described that my invention provides not only for the strengthening of both sheets, but also for the connection of the bolt with the inside sheet in a novel manner, and for the production upon both sheets of seat flanges which increase to a high degree the security of connection. It will, of course, be understood that the bolt is inserted from the outside, threaded and headed at the inside in the usual manner, and that in case of possible leakage or fracture of the bolt, repairs may be readily and conveniently made.

A special feature of the invention is the sleeveless feature, doing away with the spud or socket. When bolt is applied and riveted over on inner sheet, cap can be applied and drawn to seat, making a perfectly steam tight joint without a copper gasket and eliminating the danger of screwing the socket portion as applied on the style bolts now in use further in the sheet, thereby lessening the tension of bolt on outside sheet and changing the distribution of strain on the bolts. When this bolt is applied and once set the distribution of strain is perfect and tightening the cap after bolt is set will not alter strain on sheet, thereby making a perfectly adjusted flexible bolt which can be applied to crown sheet side sheet either on a straight or circular surface. The bolt can be applied with inner sheet on a straight line without the depressed surface and is applicable to any design of firebox.

I claim:—

1. In a flexible bolt connection, a sheet having a bolt opening, a tubular seat flange punched out from the sheet in alinement with the bolt opening, a bolt extending through the opening and having a headed end engaging said seat flange, and a cap engaging and closing the outer end of said tubular seat flange.

2. In a flexible stay bolt connection, a sheet having an inwardly flaring bolt opening, a tubular seat flange punched out from the sheet in alinement with the bolt opening and having a flared inner end forming a continuation of the flare of the opening and a concaved surface at its outer end, a bolt extending through the opening, said bolt having a headed end with a convex surface engaging the concaved surface of the seat flange, and a cap engaging and closing the outer end of said tubular seat flange.

3. In a flexible stay bolt, a fire sheet having a circular portion offset from the plane thereof and formed with a threaded opening, and a bolt having a threaded end engaging said threaded opening and a terminal head seated and inclosed below the surface of the sheet in the recess on the fire side formed by said offset portion.

4. In a flexible stay bolt, a sheet having a tubular flange offset outwardly therefrom, a circular reinforcing corrugation surrounding the flange, and a bolt having a threaded and headed end seated within the flange below the surface of the sheet.

5. In a flexible stay bolt, a sheet having an outwardly punched tubular flange internally threaded at its outer end and flared at its inner end, a circular reinforcing corrugation surrounding said flange, and a bolt having a threaded end engaging the threaded portion of the flange and a tapered head fitted within the flared portion of said flange.

6. In a flexible stay bolt, a sheet having a tubular seat flange punched outward therefrom, and a bolt having a headed end pivotally seated in said flange below the surface of the sheet.

7. In a flexible stay bolt, a sheet having a flange punched outwardly therefrom, said flange having a concavity at its outer end and being flared at its inner end, and integral at its said inner end on curved lines with the body of the sheet, and a bolt having a headed end provided with a convex portion engaging said concavity.

8. In combination, a fire box sheet having an interiorly threaded bolt opening formed in a struck up flanged portion thereof with a corrugation in the sheet about the opening, an outside sheet with an unthreaded flared opening therein, and a stay bolt having threaded connection at one end with the bolt opening in the fire box sheet and its opposite end flaring and engaging the flaring wall of the opening in the outside sheet.

9. In combination, a fire box sheet having an interiorly threaded bolt opening formed in a struck up flanged portion thereof with a corrugation in the sheet about the opening, an outside sheet having a flaring bolt opening, the wall of which is struck up forming a flange, a stay bolt having threaded connection with the opening in the fire box sheet and its opposite ends flaring and engaging the flaring wall in the bolt opening in the outside sheet, and a cap fitted over the flange about the bolt opening in the outside sheet.

10. In combination, a fire box sheet having interiorly threaded bolt opening formed in a struck up flanged portion thereof with corrugation in the sheet about the opening, an outside sheet having a bolt opening, the wall of which is struck up to form a flange, and a stay bolt having threaded connection with the opening in the fire box sheet and a head adjacent to an unthreaded portion of the bolt and engaging an opening in the fire box sheet, the opposite end of the bolt flaring and engaging a flaring wall in the opening in the outside sheet and having a recess in its end.

11. In combination, a fire box sheet having an interiorly threaded bolt opening formed in a struck up flanged portion thereof with a corrugation in the sheet about the opening, an outside sheet having a bolt opening, the wall of which is struck up forming a flange, a stay bolt having threaded connection at one end with the opening in the fire box sheet, the end of the bolt adjacent to the threaded part flaring and having a concaved circumference and engaging the convexed wall of the corrugation about the bolt opening in the fire box sheet, the other end of the bolt flaring and engaging a flaring wall in the opening in the outside sheet.

12. In combination, a fire box sheet having an interiorly threaded bolt opening formed in a struck up flanged portion thereof with a corrugation in the sheet about the opening, an outside sheet having a bolt opening, the wall of which is struck up forming a flange, a stay bolt having threaded connection at one end with the opening in the fire box sheet, the end of the bolt adjacent to the threaded part flaring and having a concaved circumference and engaging the convexed wall of the corrugation about the bolt opening in the fire box sheet, the other end of the bolt flaring and engaging a flaring wall in the opening in the outside sheet, and a cap fitted over the outer threaded circumference of the flange about the opening in the outside sheet.

In testimony whereof I affix my signature in presence of two witnesses.

PETER F. GALLAGHER.

Witnesses:
C. C. HINES,
BENNETT S. JONES.

Copies of this patent may be obtained for five cents each, by addressing the "Commissioner of Patents, Washington, D. C."